H. P. KRAFT.
INFLATING COUPLING.
APPLICATION FILED OCT. 25, 1918.

1,370,128.

Patented Mar. 1, 1921.

WITNESS
Rene Bruine

INVENTOR
Henry P. Kraft,
By Attorneys,
Fraser, Durk & Myers

UNITED STATES PATENT OFFICE.

HENRY P. KRAFT, OF RIDGEWOOD, NEW JERSEY, ASSIGNOR TO A. SCHRAEDER'S SON INCORPORATED, OF BROOKLYN, NEW YORK, A CORPORATION OF NEW YORK.

INFLATING-COUPLING.

1,370,128.  Specification of Letters Patent.  Patented Mar. 1, 1921.

Application filed October 25, 1918. Serial No. 259,608.

*To all whom it may concern:*

Be it known that I, HENRY P. KRAFT, a citizen of the United States of America, residing in Ridgewood, in the county of Bergen and State of New Jersey, have invented certain new and useful Improvements in Inflating-Couplings, of which the following is a specification.

This invention relates to valve couplings or connectors for inflating a pneumatic tire from an air hose connected to a tank or reservoir of compressed air. Such inflating couplings have an internal check valve which when disconnected is closed by the internal pressure to prevent the escape of the air; and have packing means whereby when applied to a tire valve, the coupling makes a substantially leak-tight engagement with the lip or nipple of the valve casing; and have means whereby when so applied to a tire valve the check valve within the coupling is opened, and also preferably the check valve within the tire valve is opened so as to afford a free passage for the air entering the tire.

The present invention relates to improvements upon the construction set forth in the reissued patent of Frank B. Charroin, dated July 23, 1918, Reissue No. 14,494. The nature of the improvements will be made apparent as the description proceeds.

Figure 1 of the accompanying drawing is an elevation of the coupling with its soft rubber protector or jacket.

Figure 1:
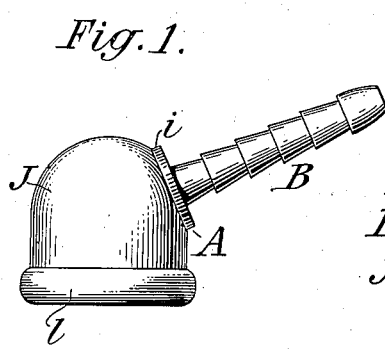

In the drawings, A represents the head or body of the coupling having the usual tubular shank B for entering and engaging the hose C which leads from the compressed air tank. D is the internal check valve which when closed seats against a gasket E of suitably soft rubber. This gasket is confined between flange or shoulder F in the body A and a screw plug G which screws tightly into a threaded recess in such body against a shoulder H therein. The outer margin of the gasket is best gripped or indented between a sharp projecting edge of the shoulder F and a lip I projecting upwardly from the plug G. A central hole *a* in the plug G is made of such size as to freely admit the reduced end portion or nipple of a tire valve, and the plug is of such length that this hole serves as a guide to limit the tilting movement of the coupling when applied to the tire valve, so as to keep the working parts in substantial alinement. The check valve D has a guiding stem *b* which works in a recess *c* in the body A, and when the check valve is fully open, abuts against the bottom of said recess to form a stop. The check valve has a projection *d* which enters freely through the central hole in the rubber gasket, being preferably flattened to afford free passage of air past it. This projection has a double function in that when the coupling is in use, as shown in Fig. 3, it is engaged by the lip of the tire valve so as to mechanically lift the check valve; and it engages the valve pin (or deflating pin) *e* of the tire valve, so as to press down and unseat the check valve *f* therein, thereby throwing the tire valve wide open; both operations being substantially simultaneous in the act of applying the coupling to the tire valve casing and pressing it down thereon.

As in the said Charroin patent the gasket has in the preferred construction shown a three-fold function, namely, it makes an air tight joint with the valve casing or nipple; it makes an air-tight seat with the check valve D; and it makes an air-tight joint at its marginal connection with the body or casing A of the coupling.

Figure 2:
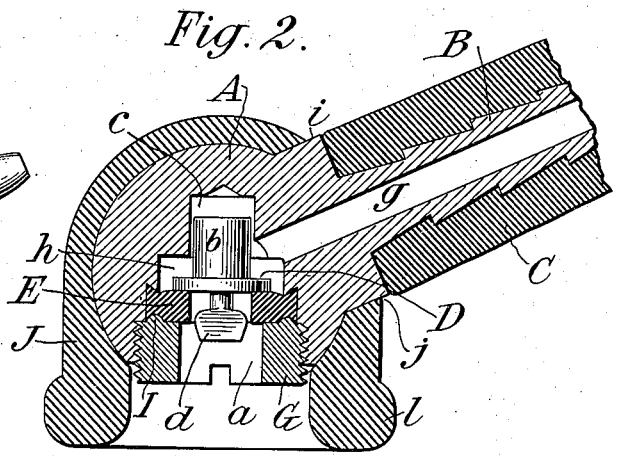
Fig. 2 is a mid-section thereof on a magnified scale, showing the coupling disconnected and its check valve closed by the internal pressure.

In the inoperative position shown in Fig. 2 compressed air entering through the bore *g* of the shank B enters the check valve chamber *h* and presses down on the check valve, holding it firmly in air-tight engagement with the rubber gasket. At the same time air is prevented from escaping from the chamber by the tight packing afforded by the clamping of the marginal portion of the gasket between the shoulder F and the plug G.

Figure 3:
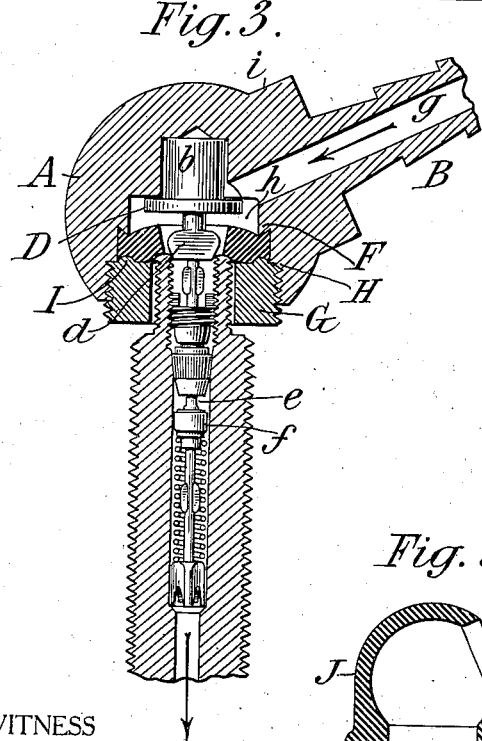
Fig. 3 is a similar section (the rubber jacket being omitted), showing the coupling applied to a tire valve in the act of inflating.

In the operative position shown in Fig. 3, the check valve has been unseatd by the tire valve casing and lifted sufficiently above the gasket so as to leave a free air passage between; the rim or lip of the tire valve nipple presses up against the gasket so as to partially embed itself therein, and thereby an air-tight joint is made between the gasket and the tire valve casing, so that the compressed air cannot leak outwardly; the compressed air in this condition of the parts has a free flow from the bore $g$ through chamber $h$ to the opening in the gasket, and through the interior of the tire valve into the tire.

In this last position the projection $d$ from the check valve is engaged on its tapering sides by the lip of the tire valve, while its bottom or end engages and presses down the tire valve pin.

The construction differs from the specific construction set forth in said Charroin patent in several respects, aside from the widely different proportions and arrangements of parts whereby the whole structure is made more compact and better able to withstand the strains of use. The check valve, instead of being wholly above the gasket, has the projection $d$ which extends down through the opening in the gasket, and makes direct contact with the nipple of the tire valve, so that the check valve is unseated by the direct thrust of the tire valve instead of by the distortion of the rubber gasket. In the present construction although the gasket is naturally subject to some distortion or flexure due to the pressure of the nipple against its under face, this flexure is unessential to the lifting of the valve. The central opening in the gasket is made larger than in the Charroin device, although still sufficiently small to make annular end contact with the lip of the tire valve. The new construction permits the omission of the perforated annular boss or flange formed on the under side of the check valve in the Charroin construction; the check valve no longer has to be cupped so as to make edge contact at its peripheral portion, but may be a simple flat disk which makes face contact with the upper side of the gasket. In the former construction the lifting movement of the valve was imparted by the engagement of the annular face or lip of the tire valve nipple with the gasket, whereas in the improved construction the lifting engagement occurs against the inner edge of the lip by its contact with the inclined sides of the projection $d$. It is due to the shape of this projection that the check valve is lifted by direct thrust from the tire valve nipple while yet having the latter overlaid by the gasket so as to make a leak-tight seal against the lip of the nipple. While the inward deflection of the gasket is normally less than in the Charroin device, yet the tendency of such deflection is to draw the outer portion of the gasket inwardly, and this is liable to gradually pull it away from the grip of the parts between which its margin is pinched, thus causing leakage, and also to affect the face of the gasket so that the check valve may cease to hold the compressed air; these difficulties are avoided by the provision of one or both the circumferential ribs F, I, which indent the margin of the gasket and hold it against inward strain.

Figure 4:
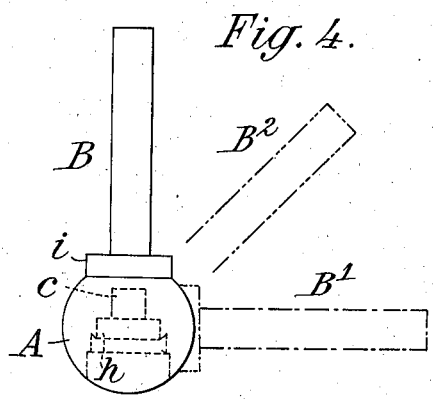
Fig. 4 is an elevation, showing the coupling shell in the process of manufacture.
Figure 5:
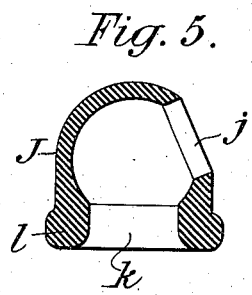
Fig. 5 is a section of the rubber jacket, detached.

The body or head A of the coupling is made quite massive in order to afford a strong protection for the inclosed parts. This head is preferably made spherical, as shown. A suitable mode of construction is to forge the body from rod by an upsetting process which forms the spherical head; thus the rod used may be of the maximum diameter of the shank B, being afterward turned down to form the usual tapered flanges for engaging the hose. One advantage of the construction of a spherical head is that it readily lends itself to the projection of the shank B in any desired angular direction with respect to the finished coupling. This is indicated in Fig. 4, where in full lines the shank B is shown as projecting vertically in line with the internal chamber $h$ and recess $c$ while in dotted lines it is shown at B' and B² in two angularly different positions. After first forming the head A and shank B by forging, upsetting or casting, as may be preferred, the blank is chucked for boring out the head with the shank B projecting in any angular direction desired, whereupon the boring and threading operations are performed, with the result that the finished coupling may be adapted for end engagement, lateral engagement, or oblique engagement, as may be desired.

Another feature of the invention provides means for protecting inflation couplings from injury. Such couplings are attached to a hose leading from the source of compressed air, which hose is usually of considerable length and is hung so low as to bring the coupling within convenient reach of the air valves of the tires of an automobile, whatever may be their position; and it is rarely that the persons using such couplings take the pains to hang them up or restore them to a place of safety. Ordinarily the user will simply drop the coupling and let it fall by its own weight upon the garage floor or upon the sidewalk, or wherever the device is used. The coupling thus strikes a blow upon a floor or sidewalk usually of stone, concrete, or other hard material, the result of which is frequently to break the coupling, even if its outer shell or head be made of exceptionally strong material. Even if not broken, the internal parts are liable to be misplaced or strained, so that the check valve or internal packing is liable to leak and permit air to escape. These difficulties have been encountered for several years past, ever since the introduction of inflating valves or couplings of this character.

According to the present invention, the spherical head A is inclosed within a cup-shaped jacket J of soft rubber, which forms a yielding protecting cushion enveloping the coupling head. This cushion is of suitable thickness, so that it softens the blow when the head is let fall upon the hard floor, and thereby protects the coupling from breakage or injury. The jacket has a hole $j$ through which the shank B passes out, and has an opening $k$ coinciding with the outlet end of the coupling, and around this opening $k$ the jacket is formed with a downwardly-projecting lip $l$ which projects considerably beyond the outlet end of the coupling and is suitably larger than the opening $a$ through the plug G. The lip $l$ is also preferably thickened so as to afford a greater cushioning effect over this portion of the coupling. The lip $l$ forms an outwardly-projecting bead which guides the operator in applying the coupling to the tire valve. The coupling head is preferably formed with a cylindrical neck $i$ which passes through and makes a tight joint with the hole $j$ in the jacket. This neck $i$ also forms an abutment against which the end of the hose C may be pushed when the hose is applied upon the shank. Thus the head is enveloped and protected by the jacket J, and the shank is enveloped and protected by the hose, so that in use the coupling is practically completely enveloped and concealed, and thereby protected from shocks, blows, or other injuries. An advantage of the spherical form of head is that the jacket requires but little stretching to introduce the head within it.

The details of construction and the proportions of the parts may be greatly varied without departing from the invention herein set forth.

I claim as my invention:—

1. In a coupling for inflation, a casing having a passage for compressed air, a flexible gasket secured marginally to said casing adapted to contact with the end of the nipple of a tire valve or the like, and a check valve in said casing adapted to seat against said gasket, and having a projection adapted for direct engagement by the rim of the nipple of the tire valve to unseat the check valve.

2. In a coupling for inflation, a casing having a passage for compressed air, a flexible gasket secured marginally to said casing adapted to contact with the end of the nipple of a tire valve or the like, and a check valve in said casing adapted to seat against said gasket, and having a projection therefrom extending through the opening in the gasket adapted for direct engagement with such nipple, whereby to unseat the check valve without necessarily distorting the gasket, and said projection adapted to engage the tire valve pin to open the tire valve.

3. In a coupling for inflation, a casing having a passage for compressed air, a flexible gasket secured marginally to said casing adapted to contact with the end of the nipple of a tire valve or the like, and a check valve in said casing adapted to seat against said gasket, and having a projection therefrom extending through the opening in the gasket, and having inclined sides adapted to be engaged by such nipple to unseat the check valve, and a central abutment adapted to press down the tire valve pin to open the tire valve.

4. In a coupling for inflation, a casing having a passage for compressed air, a flexible gasket secured marginally to said casing adapted to contact with the end of the nipple of a tire valve or the like, and a check valve in said casing consisting of a rigid disk making face contact with said gasket, and having a projection passing through the gasket and adapted for engagement by such nipple to unseat the check valve.

5. In a coupling for inflation, a casing having a passage for compressed air, a flexible gasket secured marginally to said casing adapted to contact with the end of the nipple of a tire valve or the like, and having its opening too small to admit such nipple, a valve seating against said gasket, the coupling at its marginal engagement with said gasket having an annular projection indenting the gasket, and serving to resist inward pull when the central portion of the gasket is deflected, and thereby to avoid distortions of the gasket where it serves as a packing for such valve.

6. In a coupling for inflation, a casing having a passage for compressed air, a flexible gasket formed as a disk with flat faces, secured marginally to said casing, adapted to contact with the end of the nipple of a tire valve or the like, and having its opening too small to admit such nipple, a valve seating against said gasket, the coupling having opposite annular portions for marginally clamping the gasket, such portions having annular projections indenting the gasket on opposite sides, and serving to resist inward pull when the central portion of the gasket is deflected.

7. In a coupling according to claim 1, a casing formed with a compact, massive head and a screw plug screwing into said head for confining the gasket, and having through it a cylindrical opening but slightly larger than the nipple of a tire valve for guiding the coupling in its engagement with such valve.

8. In a coupling according to claim 1, a casing having a substantially spherical head and an integral shank, whereby the latter may be projected at any desired angle relatively to the operative parts.

9. In a hose coupling for inflation, a casing having a shank and a substantially spherical head, and a similarly shaped soft rubber jacket enveloping said head.

10. In a coupling according to claim 9, the head formed with a substantially cylindrical neck engaging a similar opening in the rubber jacket.

11. A coupling for inflation having a head and a shank projecting therefrom for attachment to a hose, and an internal check valve, combined with a jacket of yielding cushioning material enveloping said head and adapted to cushion it from blows and protect the internal valve.

12. A coupling according to claim 11, with its rubber jacket formed at its outlet opening for receiving the tire valve, with a thickened lip or cushion projecting beyond the outlet portion of the coupling.

In witness whereof, I have hereunto signed my name.

HENRY P. KRAFT.